United States Patent
Buckanin et al.

(10) Patent No.: US 9,175,188 B2
(45) Date of Patent: Nov. 3, 2015

(54) MOISTURE-CURABLE POLYSILOXANE COATING COMPOSITION

(71) Applicant: 3M INNOVATIVE PROPERTIES COMPANY, St. Paul, MN (US)

(72) Inventors: Richard S. Buckanin, Woodbury, MN (US); Richard M. Flynn, Mahtomedi, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/407,776

(22) PCT Filed: Jun. 17, 2013

(86) PCT No.: PCT/US2013/046072
§ 371 (c)(1),
(2) Date: Dec. 12, 2014

(87) PCT Pub. No.: WO2014/025456
PCT Pub. Date: Feb. 13, 2014

(65) Prior Publication Data
US 2015/0141570 A1    May 21, 2015

Related U.S. Application Data

(60) Provisional application No. 61/665,146, filed on Jun. 27, 2012.

(51) Int. Cl.
| | | |
|---|---|---|
| *C09D 183/04* | (2006.01) | |
| *C08G 77/08* | (2006.01) | |
| *C09D 183/08* | (2006.01) | |
| *C08K 5/29* | (2006.01) | |
| *C08K 5/31* | (2006.01) | |
| *C08K 5/5399* | (2006.01) | |
| *C08G 77/04* | (2006.01) | |
| *C08G 77/12* | (2006.01) | |

(52) U.S. Cl.
CPC .............. *C09D 183/04* (2013.01); *C08G 77/08* (2013.01); *C09D 183/08* (2013.01); *C08G 77/045* (2013.01); *C08G 77/12* (2013.01); *C08K 5/29* (2013.01); *C08K 5/31* (2013.01); *C08K 5/5399* (2013.01)

(58) Field of Classification Search
None
See application file for complete search history.

(56) References Cited

U.S. PATENT DOCUMENTS

| | | |
|---|---|---|
| 3,250,808 A | 5/1966 | Moore |
| 4,181,752 A | 1/1980 | Martens |
| 6,204,350 B1 | 3/2001 | Liu |
| 7,763,358 B2 * | 7/2010 | Matsumura et al. .......... 428/452 |

FOREIGN PATENT DOCUMENTS

| | | |
|---|---|---|
| WO | WO 2010-146254 | 12/2010 |
| WO | WO 2010-149869 | 12/2010 |
| WO | WO 2012-003108 | 1/2012 |
| WO | WO 2012-003160 | 1/2012 |
| WO | WO 2013-074299 | 5/2013 |
| WO | WO 2014-025456 | 2/2014 |

OTHER PUBLICATIONS

Zheng, "Rediscovering Silicones: Molecularly Smooth, Low Surface Energy, Unfilled, UV/Vis-Transparent, Extremely Cross-Linked, Thermally Stable, Hard, Elastic PDMS", Langmuir, 2010, vol. 26, No. 24, pp. 18585-18590.
International Search Report for PCT International Application No. PCT/US2013/046072, mailed on Mar. 24, 2014, 4pgs.

* cited by examiner

*Primary Examiner* — Marc Zimmer
(74) *Attorney, Agent, or Firm* — Julie Lapos-Kuchar; Lucy C. Weiss

(57) ABSTRACT

A moisture-curable polysiloxane composition consists essentially of (a) at least one polyorganosiloxane, fluorinated polyorganosiloxane, or combination thereof comprising reactive silane functionality comprising at least one hydrosilyl moiety; and (b) at least one base selected from amidines, guanidines, phosphazenes, proazaphosphatranes, and combinations thereof; wherein the curable composition is non-foaming and has an average condensation-curable, reactive silane functionality greater than two.

19 Claims, No Drawings

MOISTURE-CURABLE POLYSILOXANE COATING COMPOSITION

CROSS REFERENCE TO RELATED APPLICATIONS

This application is a national stage filing under 35 U.S.C. 371 of PCT/US2013/046072, filed Jun. 17, 2013, which claims priority to U.S. Provisional Patent Application No. 61/665,146, filed Jun. 27, 2012, the disclosures of which are incorporated by reference in their entirety herein.

STATEMENT OF PRIORITY

This application claims the priority of U.S. Provisional Application No. 61/665,146, filed Jun. 27, 2012, the contents of which are hereby incorporated by reference.

FIELD

This invention relates to curable coating compositions comprising reactive silane functionality and, in other aspects, to processes for coating the compositions and articles prepared thereby.

BACKGROUND

Moisture-curable polysiloxane compositions cure in the presence of moisture to form crosslinked materials such as release coatings and surface treatments that are useful in many industries. For example, a polysiloxane or fluorinated polysiloxane is often selected to provide moisture-curable release coatings suitable for use with pressure-sensitive adhesives. The moisture for curing is typically obtained from the atmosphere or from a substrate to which the composition has been applied, although it can also be added to the composition (for example, to enable curing in depth or in confinement).

Moisture-curable polysiloxane compositions usually comprise siloxane polymers having groups (for example, alkoxysilyl or acyloxysilyl moieties) that can react in the presence of moisture to form cured (that is, crosslinked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form silanol compounds having hydroxysilyl groups. In the second reaction, the hydroxysilyl groups condense with other hydroxysilyl, alkoxysilyl, or acyloxysilyl groups in the presence of a catalyst to form —Si—O—Si— linkages. The two reactions occur essentially simultaneously upon generation of the silanol compound. Commonly used catalysts for the two reactions include Bronsted and Lewis acids. A single material can catalyze both reactions.

Preferably, the hydrolysis and condensation reactions proceed quickly after the moisture-curable composition has been applied, for example, to a substrate. At the same time, however, the reactions must not occur prematurely, for example, during processing or storage.

A good balance between these properties is often difficult to obtain, as rapid reactivity and storage stability are opposite properties to each other. For example, highly active catalysts such as tetraalkyl titanate esters rapidly accelerate the moisture-curing reaction but, at the same time, can make it difficult to process the materials without risking premature gelation in feed tanks, coating equipment, and other manufacturing and handling apparatus. Control of the amount of moisture can be critical, with too little moisture potentially resulting in slow or incomplete cure and too much moisture resulting in premature cure.

A variety of approaches have been used for providing moisture-curable compositions that have acceptable cure rates without processing and storage difficulties. For example, two-part systems have been developed (one part comprising a functional siloxane polymer and the other part comprising a catalyst), with the two parts being mixed immediately prior to use. While this approach has been useful in small-scale applications, it has been less efficient for large-scale manufacturing, where delays caused by having to mix the two parts have been undesirable. Furthermore, coating operations must be completed expeditiously before the composition cures in the pot, and this has been difficult when working with large surface area substrates or a large volume of composition.

Ammonium salt catalysts have been developed that are inactive until heated sufficiently to liberate an acid compound that initiates the moisture curing reaction. Liberation of the acid also generates an amine, however, that must be removed by evaporation. In addition, the heat used to activate the catalyst can damage heat-sensitive substrates onto which the composition has been applied.

Other materials (for example, onium salts such as sulfonium and iodonium salts) have been used to generate acid species in situ upon irradiation (for example, irradiation with ultraviolet light). Such materials have not required heat activation and therefore have enabled the use of heat-sensitive substrates without damage (and without the production of undesirable species requiring removal), but the materials have been relatively expensive, have exhibited cure inhibition on some substrates, and have required moisture control and the use of coating equipment with irradiation capability.

Conventional tin catalysts such as dibutyl tin dilaurate can provide stable curable polysiloxane compositions that can be processed and coated without premature gelation. In addition to typical moisture-curable systems, it has been found that curable compositions comprising dual reactive silane functionality in the form of hydrosilyl and hydroxysilyl groups (dehydrogenatively-curable systems) can be cured by using tin catalysts. The compositions have been widely used for pressure-sensitive adhesive and mold release applications but have sometimes suffered from relatively short pot lives. In addition, the use of tin catalysts is becoming particularly problematic because the organotin compounds generally employed as catalysts are now considered to be toxicologically objectionable.

Platinum catalysts have been used in the presence of bulk water to polymerize pentamethylcyclopentasiloxane ($D_5^H$) to form a stiff and brittle solid. Metal-based catalysts (particularly transition metal catalysts), as well as some acidic and basic catalysts, have been used in the presence of bulk water or alcohol to dehydrocouple polyhydridomethylsiloxane to improve its room-temperature curability (said to be insufficient for forming protective coatings).

Acceleration of cure has been achieved by the use of compounds such as diorganosulfoxides, imidazoles, and amines (including amidines and substituted guanidines) in combination with tin catalysts (and, in some cases, amine compounds alone) in various silicone compositions (including room temperature vulcanizing silicone compositions and dehydrogenatively-cured silicone compositions). Amine compounds including amidines have also been proposed for use in the absence of tin catalysts for curing moisture-curable, silyl-functional organic polymers, but practical curability of alkoxysilyl-functional organic polymers and acceptable adhesion to substrates were achieved only with strongly basic amines (those exhibiting a pH of at least 13.4 in aqueous solution).

SUMMARY

Thus, we recognize that there exists an ongoing need for curable polysiloxane compositions that can provide acceptable cure rates without significant processing and storage difficulties (for example, due to premature gelation). Preferably, these compositions will be efficiently processable (for example, without the need for mixing of a two-part system prior to cure), will employ catalysts that do not generate species requiring removal, and/or will not require heat activation (so as to enable curing at relatively low temperatures and/or the use of heat-sensitive substrates). Ideally, the compositions will employ catalysts that are relatively non-toxic, provide compositions that are relatively stable in solution but relatively fast-curing upon drying, effective in relatively low concentrations, and/or effective under relatively low moisture conditions.

Briefly, in one aspect, this invention provides a moisture-curable polysiloxane composition. The curable composition consists essentially of
  (a) at least one polyorganosiloxane, fluorinated polyorganosiloxane, or combination thereof comprising reactive silane functionality comprising at least one hydrosilyl moiety (that is, a monovalent moiety comprising a hydrogen atom bonded directly to a silicon atom); and
  (b) at least one base selected from amidines, guanidines, phosphazenes, proazaphosphatranes, and combinations thereof;
wherein the curable composition is non-foaming and has an average condensation-curable (preferably, moisture-curable; more preferably, moisture-curable and in the form of hydrosilyl moieties), reactive silane functionality greater than two.

Component (a) preferably comprises at least one polyorganosiloxane (more preferably, at least one polyalkylsiloxane (that is, at least one polyalkyl(hydro)siloxane, polydialkylsiloxane, or a combination thereof); most preferably, at least one polymethylsiloxane (that is, at least one polymethyl(hydro)siloxane, polydimethylsiloxane, or a combination thereof)) comprising reactive silane functionality comprising at least one hydrosilyl moiety. Preferably, component (a) has an average condensation-curable (preferably, moisture-curable; more preferably, moisture-curable and in the form of hydrosilyl moieties), reactive silane functionality of at least three.

The base preferably comprises at least one amidine or guanidine (more preferably, at least one amidine; most preferably, 1,8-diazabicyclo[5.4.0]-7-undecene (DBU)). The composition generally (and preferably) can be used in 100 percent solids (solventless) form but, optionally, can further comprise at least one aprotic solvent (for example, an aprotic organic solvent such as heptane). The composition preferably is substantially anhydrous.

It has been discovered that, unlike standard amine bases such as triethylamine (which are ineffective), the above-described bases can effectively catalyze the moisture curing of polysiloxane compositions comprising reactive silane functionality in the form of hydrosilyl moieties. The bases can provide relatively rapid cure (for example, upon removal of any solvent, curing can occur within periods of time as short as about 1 minute) even at temperatures as low as ambient (for example, about 23° C.), without the need for heat activation. Thus, polysiloxane compositions comprising the bases can be suitable for use in high speed coating and curing operations in an industrial setting, without the need for addition of heat. In spite of such effective curability, the compositions can exhibit relatively good storage stability (for example, for a period of weeks in a closed container) and/or relatively long pot life (for example, on the order of 8 hours or more) in 100 percent solids form or in a variety of solvents (for example, heptane, methyl ethyl ketone, or a combination thereof), without the need for mixing of a two-part system immediately prior to use.

Surprisingly, the bases can be effective in the curable polysiloxane composition of the invention in relatively small amounts (for example, at concentrations as low as about 0.5 weight percent or less (for example, about 0.1 to about 0.15 weight percent), based upon the total weight of components (a) and (b)), in the substantial absence of other moisture curing catalysts, and/or in the substantial absence of bulk water. The bases can be used as substitutes for conventional metal catalysts to provide organometallic catalyst-free, curable polysiloxane compositions that can be surprisingly rapidly cured in the presence of only atmospheric moisture. At least some of the bases (for example, DBU) are relatively non-toxic and therefore suitable for use in preparing relatively environmentally friendly or "green" polysiloxane compositions.

The curable polysiloxane composition of the invention can be cured to provide crosslinked networks having properties that can be tailored to the requirements of various different applications (for example, by varying the nature and/or degree of reactive silane functionality of starting component (a)). Thus, the curable polysiloxane composition can be used to provide coatings having a variety of surface properties for use in numerous coating applications (for example, use as protective coatings, release coatings for pressure-sensitive adhesives, water- and/or oil-repellent coatings or surface treatments, and the like).

The curable polysiloxane composition of the invention can be particularly useful in preparing relatively hard, relatively optically transparent protective coatings. The curable polysiloxane composition can also be useful in relatively sensitive applications requiring careful and/or tailored control of surface properties (for example, release coating applications), as the base catalysts do not appear to produce species requiring removal and, in some embodiments, the base catalysts are sufficiently volatile to be evaporated from the composition during processing, thereby leaving essentially no catalyst contamination in the cured material (in contrast with the metal contamination of conventional tin catalysts, which can be particularly problematic in the area of electronics).

In view of the foregoing, at least some embodiments of the curable polysiloxane composition of the invention meet the above-described, ongoing need for curable compositions that can provide acceptable cure rates without significant processing and storage difficulties (for example, being relatively stable in solution but relatively fast-curing upon drying), while also being efficiently processable (for example, without the need for mixing of a two-part system prior to cure, for contaminant removal, and/or for heat activation). At least some embodiments of the curable polysiloxane composition also employ catalysts that are relatively non-toxic, while being effective in relatively low concentrations and/or under relatively low moisture conditions.

In another aspect, this invention also provides a coating process comprising
  (a) providing the above-described curable polysiloxane composition of the invention;
  (b) providing at least one substrate having at least one major surface;

(c) applying the curable polysiloxane composition to at least a portion of at least one major surface of the substrate; and (d) allowing or inducing the curable polysiloxane composition to cure to form a coating (preferably, by exposing the composition to adventitious moisture; more preferably, by exposing the composition to atmospheric moisture; most preferably, by exposing the composition to atmospheric moisture without any addition of bulk water to the composition).

In yet another aspect, this invention provides an article comprising at least one substrate having at least one major surface, the substrate bearing, on at least a portion of at least one major surface, a coating prepared by the above-described coating process.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

As used herein, the term "and/or" means one or all of the listed elements or a combination of any two or more of the listed elements.

The words "preferred" and "preferably" refer to embodiments of the invention that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the invention.

The term "comprises" and variations thereof do not have a limiting meaning where these terms appear in the description and claims.

As used herein, "a," "an," "the," "at least one," and "one or more" are used interchangeably.

The above "Summary of the Invention" section is not intended to describe every embodiment or every implementation of the invention. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DEFINITIONS

As used in this patent application:

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"consisting essentially of" (in reference to the curable composition of the invention) means that the composition can contain other components that do not change its basic nature, including conventional additives (for example, release modifiers such as silicate resins, including MQ, Q, T, and MT silicate resins, and the like; adhesion promoters such as trialkoxysilanes; and polysiloxane components (for example, polydimethylsiloxane) having no reactive silane functionality), but the composition contains no hydroxysilyl-containing components other than hydroxyl-functional silicate resins;

"cure" means conversion to a crosslinked polymer network (for example, through catalysis);

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"hydrosilyl" refers to a monovalent moiety or group comprising a silicon atom directly bonded to a hydrogen atom (for example, the hydrosilyl moiety can be of formula —Si$(R^a)_{3-m}$(OH)$_m$, where m is an integer of 1, 2, or 3 and $R^a$ is a hydrolyzable group or is a non-hydrolyzable group other than hydroxyl (preferably, a non-hydrolyzable group) such as alkyl or aryl);

"hydroxysilyl" refers to a monovalent moiety or group comprising a silicon atom directly bonded to a hydroxyl group (for example, the hydroxysilyl moiety can be of formula —Si$(R^b)_{3-m}$(OH)$_m$ where m is an integer of 1, 2, or 3 and $R^b$ is a hydrolyzable or non-hydrolyzable group (preferably, non-hydrolyzable) such as alkyl or aryl);

"non-foaming" (in reference to a curable composition) means that the composition cures to provide a coating or film that is not a foam (preferably, a coating or film that is substantially free of gas-containing pores);

"oligomer" means a molecule that comprises at least two repeat units and that has a molecular weight less than its entanglement molecular weight; such a molecule, unlike a polymer, exhibits a significant change in properties upon the removal or addition of a single repeat unit;

"oxy" means a divalent group or moiety of formula —O—;

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine;

"perfluoroether" means a group or moiety having two saturated or unsaturated perfluorocarbon groups (linear, branched, cyclic (preferably, alicyclic), or a combination thereof) linked with an oxygen atom (that is, there is one catenated oxygen atom);

"perfluoropolyether group (or segment or moiety)" means a group or moiety having three or more saturated or unsaturated perfluorocarbon groups (linear, branched, cyclic (preferably, alicyclic), or a combination thereof) linked with oxygen atoms (that is, there are at least two catenated oxygen atoms); and "substantially anhydrous" (for example, in reference to a composition) means containing no added bulk water (preferably, having a moisture content no greater than 1 weight percent (more preferably, no greater than 0.1 weight percent), based upon the total weight of the composition).

Component (a)

Polysiloxanes suitable for use as component (a) of the curable composition of the invention include polyorganosiloxanes, fluorinated polyorganosiloxanes (preferably, fluoroalkyl-substituted polyorganosiloxanes, fluoroalkylether-substituted polyorganosiloxanes, or a combination thereof), and combinations thereof comprising reactive silane functionality comprising at least one hydrosilyl moiety (that is, a monovalent moiety comprising a hydrogen atom bonded directly to a silicon atom). The polysiloxanes can be small molecules, oligomers, polymers, or a combination thereof. Preferably, the polysiloxanes are oligomers or polymers. The polysiloxanes can be acyclic (linear or branched), cyclic, or a combination thereof. Useful polymers include those that have random, alternating, block, or graft structures, or a combination thereof.

The molecular weight and the reactive silane functionality of the polysiloxanes (including the number and nature of the hydrosilyl moieties) can vary widely, depending upon, for example, the properties desired for the curable and/or cured composition (and provided that the curable composition has an average condensation-curable, reactive silane functionality greater than two). The polysiloxanes preferably have a weight average molecular weight of about 100 to about 100,000.

Preferably, component (a) has an average condensation-curable, reactive silane functionality of at least three. The equivalent weight of component (a) (based upon its condensation-curable (preferably, moisture-curable; more preferably, moisture-curable and in the form of hydrosilyl moieties), reactive silane functionality) generally is less than about 1000 (preferably, less than about 750; more preferably, less than about 500; most preferably, less than about 400).

A preferred class of acyclic polysiloxanes includes those that can be represented by the following general formula:

$$R'_2R''SiO(R'_2SiO)_r(HR'SiO)_sSiR''R'_2 \quad (I)$$

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; each R" is independently hydrogen or R'; r is an integer of 0 to about 150 (preferably, 0 to about 100; more preferably, 0 to about 20); and s is an integer of 1 to about 150 (preferably, about 5 to about 100; more preferably, about 20 to about 80). Most preferably, each R" and each R' is methyl, r is 0, and/or s is about 40.

A preferred class of cyclic polysiloxanes includes those that can be represented by the following general formula:

$$\text{cyclo-}[(R'_2SiO)_t(HR'SiO)_v] \quad (II)$$

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; t is an integer of 0 to 60 (preferably, 0 to 10; more preferably, 0 to 5; even more preferably, 0 to 3); and v is an integer of 3 to 10 (preferably, 3 to 8; more preferably, 3 to 5). Most preferably, each R' is methyl, t is 0, and/or v is 4 or 5.

In Formulas I and II above, heteroatoms in R' can include oxygen, sulfur, nitrogen, phosphorus, and combinations thereof (preferably, oxygen, sulfur, and combinations thereof; more preferably, oxygen). Preferably, each R' is independently selected from alkyl (preferably, having 1 to about 8 carbon atoms), fluoroalkyl (preferably, having 3 to about 15 carbon atoms; more preferably, having 3 to about 10 carbon atoms; even more preferably, $R_fC_jH_{2j}$—, wherein j is an integer of 2 to about 8 (preferably, 2 or 3) and $R_f$ is a fluorinated or perfluorinated alkyl group having 1 to about 12 carbon atoms (preferably, 1 to about 6 carbon atoms)), heterofluoroalkyl (preferably, having 3 to about 50 carbon atoms; more preferably, having 3 to about 30 carbon atoms; even more preferably, $R_f'C_jH_{2j}$—, wherein j is an integer of 2 to about 8 (preferably, 2 or 3) and $R_f'$ is a fluorinated or perfluorinated heteroalkyl (preferably, ether or polyether) group having 1 to about 45 carbon atoms (preferably, 1 to about 30 carbon atoms)), aryl, and combinations thereof. Preferably, $R_f$ is a perfluoroalkyl group; and/or $R_f'$ is a perfluoroether group, a perfluoropolyether group, or a combination thereof (more preferably, $R_f'$ is a perfluoropolyether group).

Preferred $R_f'$ groups include perfluoropolyether groups that can be linear, branched, cyclic (preferably, alicyclic), or a combination thereof. The perfluoropolyether group can be saturated or unsaturated (preferably, saturated). Representative examples of useful perfluoropolyether groups include, but are not limited to, those that have perfluorinated repeating units selected from —$(C_pF_{2p})$—, —$(C_pF_{2p}O)$—, —$(CF(Z)O)$—, —$(CF(Z)C_pF_{2p}O)$—, —$(C_pF_{2p}CF(Z)O)$—, —$(CF_2CF(Z)O)$—, and combinations thereof, wherein p is an integer of 1 to about 10 (preferably, 1 to about 8; more preferably, 1 to about 6; even more preferably, 1 to about 4; most preferably, 1 to about 3); Z is selected from perfluoroalkyl, perfluoroether, perfluoropolyether, and perfluoroalkoxy groups that are linear, branched, cyclic, or a combination thereof and that have less than or equal to about 12 carbon atoms (preferably, less than or equal to about 10 carbon atoms; more preferably, less than or equal to about 8 carbon atoms; even more preferably, less than or equal to about 6 carbon atoms; still more preferably, less than or equal to about 4 carbon atoms; most preferably, less than or equal to about 3 carbon atoms) and/or less than or equal to about 4 oxygen atoms (preferably, less than or equal to about 3 oxygen atoms; more preferably, less than or equal to about 2 oxygen atoms; most preferably, zero or one oxygen atom). In these perfluoropolyether structures, different repeating units can be combined in a block, alternating, or random arrangement to form the perfluoropolyether group.

The terminal group of the perfluoropolyether group can be $(C_pF_{2p+1})$— or $(C_pF_{2p+1}O)$—, for example, wherein p is as defined above. Representative examples of useful perfluoropolyether groups include, but are not limited to, $C_3F_7O(CF(CF_3)CF_2O)_nCF(CF_3)$—, $C_3F_7O(CF_2CF_2CF_2O)_nCF_2CF_2$—, $CF_3O(C_2F_4O)_nCF_2$—, $CF_3O(CF_2O)_nC_2F_4O)_qCF_2$— and $F(CF_2)_3O(C_3F_6O)_q(CF_2)_3$— (wherein n has an average value of 0 to about 50, about 1 to about 50, about 3 to about 30, about 3 to about 15, or about 3 to about 10; and q has an average value of 0 to about 50, about 3 to about 30, about 3 to about 15, or about 3 to about 10).

Preferably, the perfluoropolyether group comprises at least one divalent hexafluoropropyleneoxy group (—$CF(CF_3)$—$CF_2O$—). Preferred perfluoropolyether groups include $F[CF(CF_3)CF_2O]_aCF(CF_3)$— (or, as represented above, $C_3F_7O(CF(CF_3)CF_2O)_nCF(CF_3)$, where n+1=a), wherein a has an average value of about 4 to about 20. Such perfluoropolyether groups can be obtained through the oligomerization of hexafluoropropylene oxide and can be preferred because of their relatively benign environmental properties.

Thus, in Formulas I and II above, each R' is more preferably independently selected from methyl, $F[CF(CF_3)CF_2O]_aCF(CF_3)C_jH_{2j}$— (wherein j is an integer of 2 to about 8 (preferably, 2 or 3) and a has an average value of about 4 to about 20), $C_4F_9C_3H_6$—, $C_4F_9C_2H_4$—, $C_4F_9OC_3H_6$—, $C_6F_{13}C_3H_6$—, $CF_3C_3H_6$—, $CF_3C_2H_4$—, phenyl, $C_6H_5C_2H_4$—, and combinations thereof (even more preferably, methyl, $F[CF(CF_3)CF_2O]_aCF(CF_3)C_jH_{2j}$— (wherein j is an integer of 2 to about 8 (preferably, 2 or 3) and a has an average value of about 4 to about 20), $CF_3C_2H_4$—, phenyl, $C_4F_9C_2H_4$—, $C_6F_{13}C_3H_6$—, and combinations thereof; most preferably, methyl).

Representative examples of useful acyclic, hydrosilyl-functional polysiloxanes include the following (wherein MW is molecular weight; R is alkyl, aryl, or a combination thereof (preferably, alkyl; more preferably, methyl); and $R_f''$ is $R_fC_jH_{2j}$- or $R_f'C_jH_{2j}$-, where j, $R_f$, and $R_f'$ are as defined above):

$R_3SiO(R_2SiO)_d(RHSiO)_eSiR_3$ (for example, having a percentage of—

RHSiO— units of 20 to 99 and a MW of 900 to 65,000), $R_3SiO(RHSiO)_eSiR_3$ (for example, having a MW of 1000 to 3000), $R_3SiO(R_2SiO)_d[R(R_f'')SiO]_f(RHSiO)_eSiR_3$, $R_3SiO[R(R_f'')SiO]_f(RHSiO)_eSiR_3$, and the like, and combinations thereof.

Representative examples of useful cyclic, hydrosilyl-functional polysiloxanes include the following (wherein MW is molecular weight; R is alkyl, aryl, or a combination thereof (preferably, alkyl; more preferably, methyl); and $R_f''$ is $R_fC_jH_{2j}$— or $R_f'C_jH_{2j}$—, where j, $R_f$, and $R_f'$ are as defined above):

cyclo-$(R_2SiO)_x(RHSiO)_y$ (for example, having a percentage of—

RHSiO— units of 10 or greater and a MW of 150 to 1,000 (preferably, 150 to 500)), cyclo-$(RHSiO)_y$ (for example, having a MW of 150 to 1000 (preferably, 150 to 500)), cyclo-$(R_2SiO)_x[R(R_f'')SiO]_z(RHSiO)_y$ (for example, having a MW of 200 to 3000), cyclo-$[R(R_f'')SiO]_z(RHSiO)_y$ (for example, having a MW of 200 to 3000), and the like, and combinations thereof.

Preferred hydrosilyl-functional polysiloxanes include cyclic polymethyl(hydro)siloxane (especially 1,3,5,7-tetramethylcyclotetrasiloxane ($D_4^H$), 1,3,5,7-tetraethylcyclotetrasiloxane (Et-$D_4^H$), and 1,3,5,7,9-pentamethylcyclopentasiloxane ($D_5^H$)); acyclic (linear or branched) polymethyl(hydro)siloxane; copolymer(s) (acyclic, cyclic, or a combination thereof) comprising methyl(hydro)siloxane units and (for example, up to about 80 mole percent of) other units selected from dialkylsiloxane units, (alkyl)(methyl)siloxane units, (alkyl)(phenyl)siloxane units, di(fluoroalkyl)siloxane units, di(heterofluoroalkyl)siloxane units, (fluoroalkyl)(alkyl)siloxane units, (heterofluoroalkyl)(alkyl)siloxane units, (heterofluoroalkyl)(phenyl)siloxane units, (fluoroalkyl)(phenyl)siloxane units, diphenylsiloxane units, and combinations thereof (wherein each alkyl group is independently selected from alkyl groups having one to about 8 carbon atoms (for example, hexyl), each fluoroalkyl group is independently selected from fluoroalkyl groups having 3 to about 15 carbon atoms, and each heterofluoroalkyl group is independently selected from heterofluoroalkyl groups having 3 to about 50 carbon atoms; and combinations thereof. Although homopolymer is often preferred, copolymers can be preferred for some applications.

More preferred hydrosilyl-functional polysiloxanes include cyclic polymethyl(hydro)siloxane (especially 1,3,5,7-tetramethylcyclotetrasiloxane ($D_4^H$), 1,3,5,7-tetraethylcyclotetrasiloxane (Et-$D_4^H$), and 1,3,5,7,9-pentamethylcyclopentasiloxane ($D_5^H$)); acyclic (linear or branched) polymethyl(hydro)siloxane; copolymer(s) (acyclic, cyclic, or a combination thereof) comprising methyl(hydro)siloxane units and (for example, up to about 75 mole percent of) units selected from dimethylsiloxane units, (fluoroalkyl)(methyl)siloxane units, (heterofluoroalkyl)(methyl)siloxane units, and combinations thereof; and combinations thereof. Most preferred hydrosilyl-functional polysiloxanes include 1,3,5,7-tetramethylcyclotetrasiloxane ($D_4^H$); 1,3,5,7-tetraethylcyclotetrasiloxane (Et-$D_4^H$); 1,3,5,7,9-pentamethylcyclopentasiloxane ($D_5^H$); acyclic (preferably, linear) polymethyl(hydro)siloxane (preferably, having a molecular weight of about 1000 to about 3000); copolymer(s) (acyclic, cyclic, or a combination thereof) comprising methyl(hydro)siloxane units and (for example, up to about 70 mole percent of) of units selected from dimethylsiloxane units, (fluoroalkyl)(methyl)siloxane units, (heterofluoroalkyl)(methyl)siloxane units, and combinations thereof; and combinations thereof.

The polysiloxanes useful as component (a) can be used in the curable composition of the invention singly or in the form of mixtures of different polysiloxanes. The polysiloxanes can be prepared by known synthetic methods and many are commercially available (for example, from Dow Corning Corporation, Midland, Mich., or from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)). Fluorinated polyorganosiloxanes can be prepared by using known synthetic methods including the platinum-catalyzed addition reaction of a fluorinated olefin and a hydrosiloxane (small molecule, oligomer, or polymer).

Component (b)

Bases suitable for use as component (b) of the curable composition of the invention include amidines, guanidines (including substituted guanidines such as biguanides), phosphazenes, proazaphosphatranes (also known as Verkade's bases), and combinations thereof. Self-protonatable forms of the bases (for example, aminoacids such as arginine) generally are less suitable and therefore excluded, as such forms are self-neutralized and therefore insoluble in the curable composition. Preferred bases include amidines, guanidines, and combinations thereof (more preferably, amidines and combinations thereof; most preferably, cyclic amidines and combinations thereof).

It has been discovered that the bases of the listed structural classes can effectively catalyze the moisture curing of component (a), as described above. The bases can be used in the curable composition singly (individually) or in the form of mixtures of one or more different bases (including bases from different structural classes). If desired, the base(s) can be present in photolatent form (for example, in the form of an activatable composition that, upon exposure to radiation or heat, generates the base(s) in situ).

Useful amidines include those that can be represented by the following general formula:

(III)

wherein R1, R2, R3, and R4 are each independently selected from hydrogen, monovalent organic groups, monovalent heteroorganic groups (for example, comprising nitrogen, oxygen, phosphorus, or sulfur in the form of groups or moieties that are preferably bonded through a carbon atom and that do not contain acid functionality such as carboxylic or sulfonic), and combinations thereof; and wherein any two or more of R1, R2, R3, and R4 optionally can be bonded together to form a ring structure (preferably, a five-, six-, or seven-membered ring; more preferably, a six- or seven-membered ring). The organic and heteroorganic groups preferably have from 1 to about 20 carbon atoms (more preferably, from 1 to about 10 carbon atoms; most preferably, from 1 to about 6 carbon atoms). Preferably, R4 is not hydrogen.

Amidines comprising at least one ring structure (that is, cyclic amidines) are generally preferred. Cyclic amidines comprising two ring structures (that is, bicyclic amidines) are more preferred.

Representative examples of useful amidine compounds include 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and the like, and combinations thereof. Preferred amidines include 1,2-dimethyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and combinations thereof, with DBU, DBN, and combinations thereof being more preferred and DBU most preferred.

Useful guanidines include those that can be represented by the following general formula:

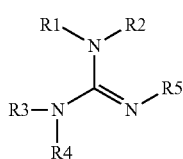

(IV)

wherein R1, R2, R3, R4, and R5 are each independently selected from hydrogen, monovalent organic groups, monovalent heteroorganic groups (for example, comprising nitrogen, oxygen, phosphorus, or sulfur in the form of groups or moieties that are preferably bonded through a carbon atom and that do not contain acid functionality such as carboxylic or sulfonic), and combinations thereof; and wherein any two or more of R1, R2, R3, R4, and R5 optionally can be bonded together to form a ring structure (preferably, a five-, six-, or seven-membered ring; more preferably, a five- or six-membered ring; most preferably, a six-membered ring). The organic and heteroorganic groups preferably have from 1 to about 20 carbon atoms (more preferably, from 1 to about 10 carbon atoms; most preferably, from 1 to about 6 carbon atoms). Preferably, R5 is not hydrogen.

Guanidines comprising at least one ring structure (that is, cyclic guanidines) are generally preferred. Cyclic guanidines comprising two ring structures (that is, bicyclic guanidines) are more preferred.

Representative examples of useful guanidine compounds include 1-methylguanidine, 1-n-butylguanidine, 1,1-dimethylguanidine, 1,1-diethylguanidine, 1,1,2-trimethylguanidine, 1,2,3-trimethylguanidine, 1,3-diphenylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, TBD (that is, 1,5,7-triazabicyclo[4.4.0]dec-5-ene), MTBD (that is, 7-methyl-1,5,7-triazabicyclo[4.4.0]dec-5-ene), 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, 7-decyl-1,5,7-triazabicyclo[4.4.0]dec-5-ene, biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisguanide, 1-[3-(diethylamino)propyl]biguanide, 1-[3-(dibutylamino)propyl]biguanide, N',N"-dihexyl-3,12-diimino-2,4,11,13-tetraazatetradecanediamidine, and the like, and combinations thereof. Preferred guanidines include TBD (that is, 1,5,7-triazabicyclo[4.4.0]dec-5-ene), MTBD (that is, 7-methyl-1,5,7-triazabicyclo[4.4.0]dec-5-ene), 2-tert-butyl-1,1,3,3-tetramethylguanidine, and combinations thereof. More preferred are TBD, MTBD, and combinations thereof.

If desired, the amidines and guanidines can be selected from those exhibiting a pH value lower than 13.4 when measured according to JIS Z 8802 (for example, 1,3-diphenylguanidine, DBU, DBN, or a combination thereof; preferably, DBU, DBN, or a combination thereof). The referenced method for determining the pH of aqueous solutions, JIS Z 8802, is carried out by first preparing an aqueous solution of base by adding 5 millimoles of base to 100 g of a mixed solvent composed of isopropyl alcohol and water in a weight ratio of 10:3. The pH of the resulting solution is then measured at 23° C. using a pH meter (for example, a Horiba Seisakusho Model F-22 pH meter).

Useful phosphazenes include those that can be represented by the following general formula:

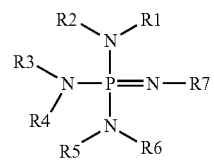

(V)

wherein R1, R2, R3, R4, R5, R6, and R7 are each independently selected from hydrogen, monovalent organic groups, monovalent heteroorganic groups (for example, comprising nitrogen, oxygen, phosphorus, or sulfur in the form of groups or moieties that are preferably bonded through a carbon atom and that do not contain acid functionality such as carboxylic or sulfonic), and combinations thereof; and wherein any two or more of R1, R2, R3, R4, R5, R6, and R7 optionally can be bonded together to form a ring structure (preferably, a five-, six-, or seven-membered ring; more preferably, a five- or six-membered ring; most preferably, a six-membered ring). The organic and heteroorganic groups preferably have from 1 to about 20 carbon atoms (more preferably, from 1 to about 10 carbon atoms; most preferably, from 1 to about 6 carbon atoms). Preferably, R7 is not hydrogen.

Representative examples of useful phosphazene compounds include

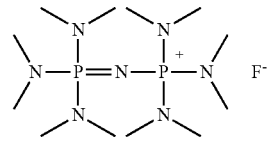

1,1,1,3,3,3-hexakis(dimethylamino)diphosphazenium fluoride

-continued

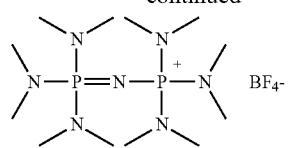

1,1,1,3,3,3-hexakis(dimethylamino)diphosphazenium tetrafluoroborate

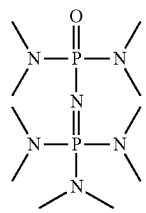

1,1,3,3,3-pentakis(dimethylamino)$1\lambda^5, 3\lambda^5$-diphosphazene 1-oxide

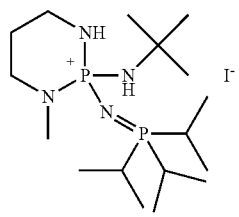

2-tert-butylamino-1-methyl-2-[tris(dimethylamino)phosphoranylidenamino]-perhydro-1,3,2-diazaphosphorinium iodide

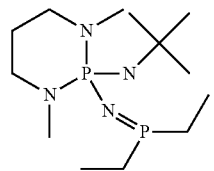

2-tert-butylimino-2-diethylamino-1,3-dimethylperhydro-1,3,2-diazaphosphorine

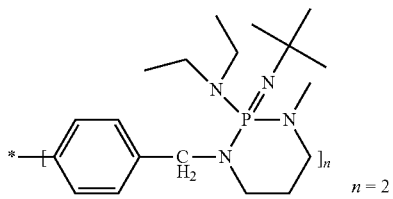

2-tert-butylimino-2-diethylamino-1,3-dimethylperhydro-1,3,2-diazaphosphorine

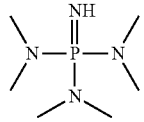

imino-tris(dimethylamino)phosphorane

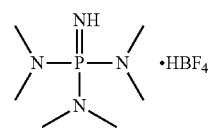

iminotris(dimethylamino)phosphonium tetrafluoroborate salt

-continued

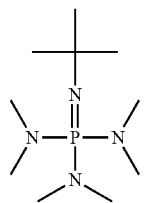

phosphazene base $P_1$-t-Bu

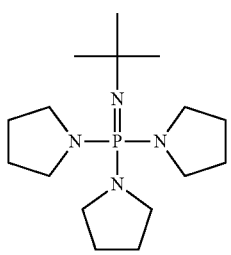

phosphazene base $P_1$-t-Bu-tris(tetramethylene) purum

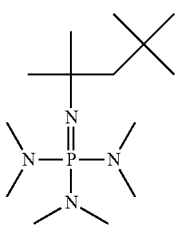

phosphazene base $P_1$-t-Oct

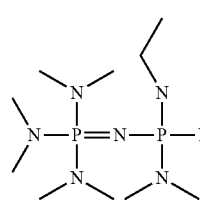 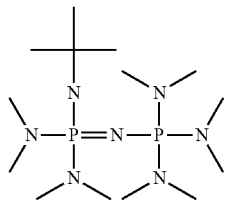

phosphazene base $P_2$-Et purum    phosphazene base $P_2$-t-Bu

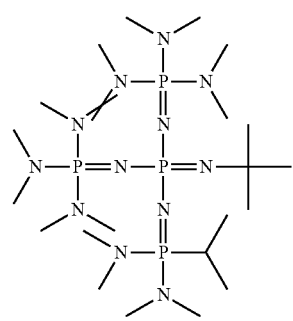

phosphazene base $P_4$-t-Bu

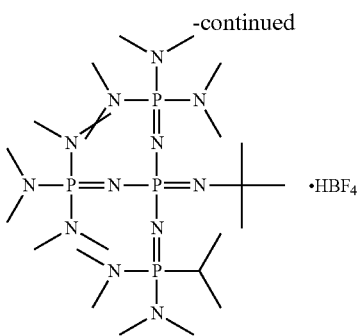

phosphazene base P$_4$-t-Bu tetrafluoroborate salt

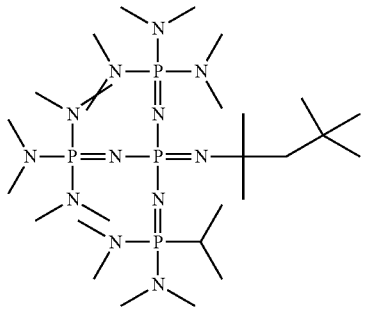

phosphazene base P$_4$-t-Oct

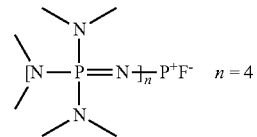

tetrakis[tris(dimethylamino)phosphoranylidenamino]
phosphonium fluoride

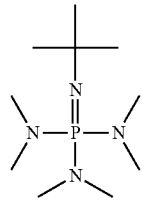

tert-butylimino-tris(dimethylamino)phosphorane and the like, and combinations thereof. Preferred phosphazenes include 2-tert-butylimino-2-diethylamino-1,3-dimethylperhydro-1,3,2-diazaphosphorine, phosphazene base P$_1$-t-Bu-tris(tetramethylene), phosphazene base P$_4$-t-Bu, and combinations thereof.

Useful proazaphosphatrane bases (Verkade's bases) include those that can be represented by the following general formula:

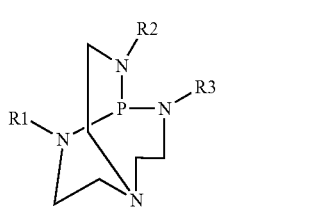

(VI)

wherein R1, R2, and R3 are each independently selected from hydrogen, monovalent organic groups, monovalent heteroorganic groups (for example, comprising nitrogen, oxygen, phosphorus, or sulfur in the form of groups or moieties that are preferably bonded through a carbon atom and that do not contain acid functionality such as carboxylic or sulfonic), and combinations thereof (less preferably hydrogen). The organic and heteroorganic groups preferably have from 1 to about 20 carbon atoms (more preferably, from 1 to about 10 carbon atoms; most preferably, from 1 to about 6 carbon atoms).

Representative examples of useful proazaphosphatrane compounds include

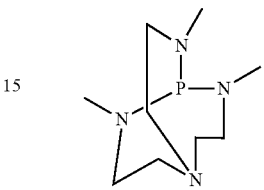

2,8,9-trimethyl-
2,5,8,9-tetraaza-1-
phosphabicyclo
[3.3.3]undecane

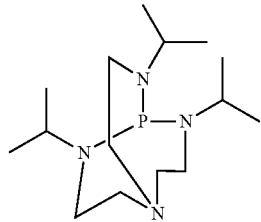

2,8,9-triisopropyl-
2,5,8,9-tetraaza-1-
phosphabicyclo[3.3.3]undecane

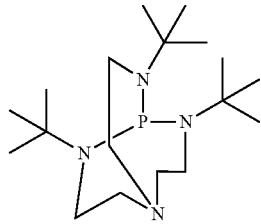

2,8,9-triisobutyl-
2,5,8,9-tetraaza-1-
phosphabicyclo[3.3.3]undecane and the like, and combinations thereof. 2,8,9-triisopropyl-2,5,8,9-tetraaza-1-phosphabicyclo[3.3.3]undecane is a preferred proazaphosphatrane compound.

Preparation of Curable Composition

The curable composition of the invention can be prepared by combining components (a) and (b) (preferably, with agitation or stirring). The composition can be maintained as a relatively shelf-stable, 2-part system (for example, by keeping component (b) separate from component (a)), if desired, but a 1-part system (comprising both components) can also be stable for periods of up to, for example, about two weeks in dry solvent or 100 percent solids form (a relatively long pot life), prior to coating or other application of the composition.

Component (b) (the base catalyst(s)) can be present in the curable composition in non-zero amounts ranging up to about 5 or 10 weight percent (preferably, from about 0.01 to about 3 weight percent; more preferably, from about 0.01 to about 1 or 2 weight percent; even more preferably, from about 0.01 to about 0.5 weight percent; most preferably, about 0.1 weight percent), based upon the total weight of components (a) and (b).

Optionally, the curable composition comprises at least one aprotic solvent or diluent to aid in storage stability, mixing, and/or coating, particularly when component (a) is polymeric. Suitable solvents for use in the curable composition of the invention include aprotic solvents such as aromatic solvents (for example, xylene, toluene, 1,2-dichlorobenzene, 1,3-dichlorobenzene, 1,4-dichlorobenzene, and the like, and mixtures thereof), ketones (for example, methyl ethyl ketone (MEK), cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Preferred solvents include aromatic solvents, alkanes, ketones, and mixtures thereof; with xylene, heptane, methyl ethyl ketone, and mixtures thereof being more preferred and heptane, methyl ethyl ketone, and mixtures thereof most preferred.

Minor amounts of optional components can be added to the curable composition to impart particular desired properties for particular curing methods or uses. Useful compositions can comprise conventional additives such as, for example, catalysts (including conventional condensation catalysts such as tin catalysts, which can be added as co-catalysts if desired), initiators, emulsifiers (including surfactants), stabilizers, anti-oxidants, flame retardants, adhesion promoters (for example, trialkoxysilanes), release modifiers (for example, silicate resins including silicate MQ resin), colorants, polysiloxanes (for example, polydimethylsiloxane) having no reactive silane functionality, thickeners (for example, carboxy methyl cellulose (CMC), polyvinylacrylamide, polypropylene oxide, polyethylene oxide/polypropylene oxide copolymers, polyalkenols), and the like, and mixtures thereof.

Use and Curing of Curable Composition

The curable composition of the invention can be used in various different applications. For example, the composition(s) can be used as sealants, release coatings, surface treatments, hardcoats, and the like. When used as fluorinated surface treatments, a degree of hydrophobicity and/or oleophobicity can be imparted to a variety of substrates (for example, for surface protection or to enhance ease of cleaning).

The curable composition of the invention (or, alternatively, its components) can be applied to at least a portion of at least one major surface of a substrate (for example, a sheet, a fiber, or a shaped object) by essentially any known or hereafter-developed application method, so as to form a variety of different coated articles. The composition can be applied in essentially any manner (and with essentially any thickness) that can form a useful coating.

Useful application methods include coating methods such as dip coating, spin coating, spray coating, wiping, roll coating, wire coating, and the like, and combinations thereof. The composition can be applied in neat form or in the form of solvent solutions (for example, in solvents such as alkyl esters, ketones, alkanes, aromatics, and the like, and mixtures thereof). When solvent is used, useful concentrations of the composition can vary over a wide range (for example, from about 1 to about 90 weight percent), depending upon the viscosity of the composition, the application method utilized, the nature of the substrate, and the desired properties.

Substrates suitable for use in preparing the coated articles include those having at least one surface comprising a material that is solid and preferably substantially inert to any coating or application solvent that is used. Preferably, the curable composition can adhere to the substrate surface through chemical interactions, physical interactions, or a combination thereof (more preferably, a combination thereof).

Suitable substrates can comprise a single material or a combination of different materials and can be homogeneous or heterogeneous in nature. Useful heterogeneous substrates include coated substrates comprising a coating of a material (for example, a metal or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like) including multi-layer polymeric films, metals (for example, copper, silver, gold, aluminum, iron, stainless steel, nickel, zinc, and the like), metal alloys, metal compounds (for example, metal oxides and the like), leather, parchment, paper, textiles, painted surfaces, and combinations thereof. Preferred substrates include glass, minerals, wood, paper, metals, metal alloys, metal compounds, polymers, and combinations thereof (more preferably, paper, metals, metal alloys, metal compounds, polymers, and combinations thereof).

Preferred substrates include those used for pressure-sensitive adhesive (PSA) products. For example, the curable composition can be applied to suitable flexible or inflexible backing materials and then cured. Useful flexible backing materials include paper, Kraft paper, polyolefin-coated paper, plastic films (for example, poly(propylene), poly(ethylene), poly(vinyl chloride), polyester (including poly(ethylene terephthalate), polyamide, cellulose acetate, and ethyl cellulose), and the like, and combinations thereof, although essentially any surface requiring release toward adhesives can be utilized. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers (including surface treatments such as corona treatment) can be utilized, but they are not always necessary.

The curable composition of the invention can provide coatings that are suitable for use in the manufacture of PSA-coated labels and tapes. The specific level of release provided upon curing can be controllably varied through variation in, for example, the molecular weight and/or reactive silane functionality of component (a) of the composition, or through the addition of release modifiers (for example, silicate resins including silicate MQ resin), which also can be varied in nature and/or amount.

The curable composition can be cured, for example, by exposure to adventitious moisture (preferably, by exposing the composition to atmospheric moisture; more preferably, by exposing the composition to atmospheric moisture without any addition of bulk water to the composition). The preferred curing conditions will vary, depending upon the particular application and its accompanying requirements and conditions. Cure generally can be effected at temperatures ranging from room temperature (for example, about 20-23° C.) up to about 150° C. or more (preferably, temperatures of about 20° C. to about 125° C.; more preferably, about 20° C. to about 100° C.; even more preferably, about 20° C. to about 80° C.; most preferably, about 20° C. to about 50° C.). Curing times can range from a few minutes (for example, at room temperature) to hours (for example, under low catalyst conditions).

Release coatings obtained via cure of the curable composition of the invention generally contain little or no free silicone to adversely affect the tack and peel properties of PSAs that come in contact with them. The curable composition of the invention can cure relatively rapidly to provide relatively firmly anchored, highly crosslinked, solvent-resistant, tack-free coatings, which can be used with a broad range of PSA types (for example, acrylates, tackified natural rubbers, and tackified synthetic elastomers).

Articles in the form of PSA laminates (for example, comprising a layer of PSA borne on a release liner) can be prepared by placing a PSA layer in contact with the release coating through dry lamination, wet solution casting, or even by application of a photopolymerizable composition to the release coating, followed by irradiation to effect photopolymerization (for example, as described in U.S. Pat. No. 4,181,752 (Martens et al.), the description of which is incorporated herein by reference). Such articles can exhibit relatively good storage stability (as evidenced, for example, by the results of room temperature and/or heat accelerated aging tests to evaluate any change in the level of release (peel force) from the release coating and/or in the subsequent level of adhesion to a desired substrate).

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis.

The following is a list of materials used throughout the Examples, as well as their brief descriptions and origins.

"$D_4^H$" refers to 1,3,5,7-tetramethyl cyclotetrasiloxane, having an equivalent weight (eq. wt.) of 60, obtained from Gelest, Inc., Morrisville, Pa. under the trade designation "$D_4^H$".

"$D_5^H$" refers to 1,3,5,7,9-pentamethyl cyclopentasiloxane, having an equivalent weight of 60, obtained from Gelest, Inc., Morrisville, Pa. under the trade designation "$D_5^H$".

"Et-$D_4^H$" refers to 1,3,5,7-tetraethyl cyclotetrasiloxane, having an equivalent weight of 74, obtained from Gelest, Inc., Morrisville, Pa. under the trade designation "$D_4^H$".

"HMS-991" refers to trimethylsiloxy-terminated polymethylhydrosiloxane, $Me_3SiO[SiH(CH_3)O]_nSiMe_3$, having 100 mole percent (%) of methylhydrosiloxane units, molecular weight of 1400-1800 and an equivalent weight of 67, obtained from Gelest, Inc., Morrisville, Pa. under the trade designation "HMS-991".

"HMS-992" refers to trimethylsiloxy-terminated polymethylhydrosiloxane, having 100 mole percent (%) of methylhydrosiloxane units, molecular weight of 1800-2100 and an equivalent weight of 65, obtained from Gelest, Inc., Morrisville, Pa. under the trade designation "HMS-992".

"HMS-501" refers to methylhydrosiloxane-dimethylsiloxane copolymer, trimethylsiloxy-terminated, having 50-55 mole percent (%) of methylhydrosiloxane units, a molecular weight of 900-1200 and an equivalent weight of 135, obtained from Gelest, Inc., Morrisville, Pa. under the trade designation "HMS-501".

"HMS-301" refers to methylhydrosiloxane-dimethylsiloxane copolymer, trimethylsiloxy-terminated, having 25-30 mole percent (%) of methylhydrosiloxane units, a molecular weight of 1900-200 and an equivalent weight of 245, obtained from Gelest, Inc., Morrisville, Pa. under the trade designation "HMS-301".

"HMS-151" refers to methylhydrosiloxane-dimethylsiloxane copolymer, trimethylsiloxy-terminated, having an equivalent weight of 490, obtained from Gelest, Inc., Morrisville, Pa. under the trade designation "HMS-151".

"DMS-H03" refers to hydride-terminated polydimethylsiloxane, having a hydrosiloxane functionality of 2, a molecular weight of 400-500, and an equivalent weight of 225, obtained from Gelest, Inc., Morrisville, Pa. under the trade designation "DMS-H03".

"TMDS" refers to 1,1,3,3-tetramethyl disiloxane, having a hydrosiloxane functionality of 2 and an equivalent weight of 67, obtained from Gelest, Inc., Morrisville, Pa.

"DBU" refers to 1,8-diazabicyclo[5.4.0]undec-7-ene, obtained from Aldrich Chemical Company, Milwaukee, Wis.

"NOVEC™ 7100" refers to a hydrofluoroether solvent that is commercially available from 3M Company (Saint Paul, Minn., USA) under the trade designation 3M™ NOVEC™ ENGINEERED FLUID 7100.

"NOVEC™ 7200" refers to a hydrofluoroether solvent that is commercially available from 3M Company (Saint Paul, Minn., USA) under the trade designation 3M™ NOVEC™ ENGINEERED FLUID 7200.

"HFPO" refers to hexafluoropropylene oxide, which can be obtained from E. I. du Pont de Nemours and Company, Wilmington, Del.

"ADOGEN™ 464" refers to methyltrialkyl($C_8$-$C_{10}$)ammonium chloride, obtained from Aldrich Chemical Company, Milwaukee, Wis. under the trade designation "ADOGEN™ 464".

"MEK" refers to 2-butanone, obtained from Aldrich Chemical Company, Milwaukee, Wis.

"3SAB PET film" refers to a 50 micrometer thick polyester terephthalate (PET) film obtained from Mitsubishi Polyester Film, Greer, S.C., under the trade designation "Hostaphan™ 3 SAB", which has one side chemically treated or primed to improve the adhesion of silicone coatings.

General Method for Preparing Cured Coatings

A small amount of coating formulation of Examples according to the invention was placed in a line onto a 6×12 inch (15×31 centimeters) piece of 3SAB PET film, and the line was spread to a film using a #3 Mayer coating rod in one quick motion at room temperature. The resulting film was cured at room temperature (about 23° C.) under ambient conditions.

General Method for Measuring Ink Repellency of Films

Using a black fine point permanent marker (obtained from Sanford Corp., Shelbyville, Tennessee under the trade designation "SHARPIE"), a fine line approximately 3 centimeters long was drawn from an area of film that was not coated with hydrosiloxane onto an area that was coated with hydrosiloxane. A number value of 0 (completely wettable) to 5 (completely unwettable) was assigned based on the appearance of the resulting line, using the rating table shown below. Higher numerical values thus represent superior anti-soiling performance

TABLE 1

| Appearance of Line in Uncoated Area | Appearance of Line in Coated Area | Rating |
|---|---|---|
| Bold and Unbroken | Bold and Unbroken | 0 |
| Bold and Unbroken | Less Bold But Unbroken | 1 |
| Bold and Unbroken | Less Bold and Slightly Broken | 2 |
| Bold and Unbroken | Less Bold and Moderately Broken | 3 |
| Bold and Unbroken | Faint and Moderately Broken | 4 |
| Bold and Unbroken | Faint and Very Broken (Dotted) | 5 |

General Method for Determining Pencil Hardness

Each determination was made essentially according to the procedure of test method ASTM D3363-05(2011), ASTM International, West Conshohocken, Pa.

General Method for Calculating Hydrosiloxane Functionality

The average reactive silane functionality of a composition was determined by using the method described in U.S. Pat. No. 6,204,350 (Junkang et al.). The average reactive silane functionality of a composition comprising molecules a, b, ..., n was defined by the following equation:

$$\text{Average Functionality} = \frac{faNa + fbNb + \ldots fnNn}{Na + Nb + \ldots Nn}$$

wherein fa, fb, ..., fn represent the reactive silane functionality of molecules a, b, ..., n, respectively, and Na, Nb, ..., Nn represent the number of molecules a, b, ..., n, respectively.

Preparative Example 1

PE-1

Preparation of HFPO-Derived Methyl Ester

The methyl ester $F(CF(CF_3)CF_2O)_aCF(CF_3)C(O)OCH_3$, $M_N=1379$ wherein the variable a has an average value in a range of 7 to 8, was prepared by metal fluoride-initiated oligomerization of hexafluoropropylene oxide in diglyme solvent according to the method described in U.S. Pat. No. 3,250,808 (Moore et al.), the description of which is incorporated herein by reference. The product oligomeric acyl fluoride was treated with anhydrous methanol to give the methyl ester, which was purified by distillation to remove low-boiling components.

Preparative Example 2

PE-2

Preparation of HFPO-Derived Alcohol from HFPO-Derived Methyl Ester $F(CF(CF_3)CF_2O)_aCF(CF_3)CH_2OH$, $M_N=1350$ The alcohol was prepared by reduction of the methyl ester prepared as described above in PE-1, with sodium borohydride in a NOVEC™ 7100/tetrahydrofuran solvent system, essentially by the method described in Preparative Example 2 of U.S. Patent Application No. 61/559,762 (Flynn et al., filed Nov. 15, 2011), which method is incorporated herein by reference.

Preparative Example 3

PE-3

Preparation of HFPO-Derived Allyl Ether from HFPO-Derived Alcohol $F(CF(CF_3)CF_2O)_aCF(CF_3)CH_2OCH_2CH=CH_2$, $M_N=1420$ The allyl ether was prepared by reaction of the alcohol prepared as described above in PE-2, with allyl bromide in NOVEC™ 7200 solvent in the presence of potassium hydroxide, water, and tetrabutylammonium bromide, essentially by the method described in Preparative Example 2 of U.S. Patent Application No. 61/559,762 (Flynn et al., filed Nov. 15, 2011), which method is incorporated herein by reference.

In the following Preparative Examples, either 1,3-bis(trifluoromethyl)benzene or 1,4-bis(trifluoromethyl)benzene could be used interchangeably.

Preparative Example 4

PE-4

Preparation of Reaction Product of HFPO-Derived Allyl Ether with HMS-991 (1 Percent Equivalent Loading of Allyl Ether to Siloxane)

HMS-991 (20 g, 0.298 eq) and HFPO-derived allyl ether (prepared as described above in PE-3, $M_N=1420$, 4.23 g, 0.003 eq) were placed in a 100 mL round bottom flask with 1,4-bis(trifluoromethyl)benzene (60 mL, obtained from Alfa Aesar, Ward Hill, Mass.), and the resulting mixture was heated. When the temperature of the mixture reached about 50° C., platinum hydrosilation catalyst [platinum(0)-1,3-divinyl-1,1,3,3-tetramethyldisiloxane complex, solution in xylenes (approximately 2 weight percent platinum, obtained from Aldrich Chemical Company, Milwaukee, Wis.)] (0.05 g) was added to the mixture, and the resulting composition was heated to 60° C. for 16 hours. At the end of this time, solvent was stripped from the composition via rotary evaporation at 55° C. and a reduced pressure of 15 torr (1.60 kPa). The H-NMR spectrum of the resulting product was consistent with the desired structure and also showed the presence of some unreacted allyl ether.

Preparative Example 5

PE-5

Preparation of Reaction Product of HFPO-Derived Allyl Ether with HMS-991 (2 Percent Equivalent Loading of Allyl Ether to Siloxane)

This reaction was carried out in a manner essentially identical to that of PE-4 with the following charges: HMS-991 (20 g, 0.298 eq); HFPO-derived allyl ether ($M_N=1420$, 8.48 g, 0.006 eq); 1,4-bis(trifluoromethyl)benzene (82 g); and the platinum hydrosilation catalyst (0.05 g) at 60° C. for 16 hours, with the workup as described above in PE-4. The H-NMR spectrum of the resulting product was consistent with the desired structure and also showed the presence of some unreacted allyl ether.

Preparative Example 6

PE-6

Preparation of Reaction Product of HFPO-Derived Allyl Ether with HMS-991 (0.5 Percent Equivalent Loading of Allyl Ether to Siloxane)

This reaction was carried out in a manner essentially identical to that of PE-4 with the following charges: HMS-991 (20 g, 0.298 eq); HFPO-derived allyl ether ($M_N$=1420, 2.12 g, 0.0015 eq); 1,4-bis(trifluoromethyl)benzene (80 g); and the platinum hydrosilation catalyst (0.05 g) at 60° C. for 16 hours, with the workup as described above in PE-4.

Preparative Example 7

PE-7

Preparation of C3F7C(CF3)2CH2CH=CH2

Into a 1-L, 3-necked round bottom flask equipped with a water condenser under a nitrogen atmosphere and an over head stirrer were placed perfluoro-4-methyl-2-pentene (250 g, 0.83 mol, obtained from SynQuest Laboratories, Alachua, Fla.), spray-dried potassium fluoride (48.3 g, 0.83 mol, obtained from Aldrich Chemical Company, Milwaukee, Wis., and further dried and stored in a 125° C. oven), dimethyl formamide (330 g), ADOGEN™ 464 (20 g of a 51 percent solution in diglyme, which had been dried by azeotropic distillation of some of the diglyme), potassium iodide (5.0 g, 0.03 mol), and allyl bromide (101.4 g, 0.84 mol). The resulting mixture was heated to 45° C. while vigorously stirring for 16 hours and then for an additional 24 hours at 55° C. At the end of this time, water (300 g) was added to the mixture, and the resulting composition was azeotropically distilled using a Dean Stark apparatus. The resulting lower fluorochemical phase was collected and washed once with an equal volume of water to afford 260 g crude product, which was distilled though a concentric tube column and the resulting fraction at 119° C. collected. An earlier fraction of distillation range 118-119° C. was treated with 50 mL of 40 percent aqueous potassium hydroxide and 250 g water by stirring at room temperature for 16 hours and was subsequently azeotropically distilled and then combined with the other fraction. The resulting product was 99.7 percent pure.

Preparative Example 8

PE-8

Reaction of HMS-991 with $C_3F_7C(CF_3)_2CH_2CH=CH_2$

HMS-991 (20 g, 0.298 eq), $C_3F_7C(CF_3)_2CH_2CH=CH_2$ (10.75 g, 0.03 eq, prepared as described above in PE-7), and 1,3-bis(trifluoromethyl)benzene (55 g, obtained from TCI America, Portland, Oreg.) were combined and heated to 60° C. and the above-described platinum hydrosilation catalyst (0.15 g) added. After a brief exothermic reaction to 73° C., the resulting mixture was held at 60° C. for 18 hours. Solvent was removed from the mixture by rotary evaporation at 55° C. and 15 torr (1.60 kPa). 27.6 g of the resulting product were mixed with 82.8 g NOVEC™ 7100 to give a 25 percent by weight solution. H-1 and F-19 NMR spectra of the solution were consistent with the expected hydrosilation structure of the product.

Preparative Example 9

PE-9

Reaction of D4H with HFPO-Derived Allyl Ether

Into a 250 mL, three-necked round bottom flask equipped with an addition funnel, a water condenser topped with a tee leading to a source of dry nitrogen, and a mineral oil bubbler, were placed $D_4^H$ (5.0 g, 0.0205 mol) and 1,3-bis(trifluoromethyl)benzene (66 g). The HFPO-derived allyl ether ($M_N$=1420, 29.1 g, 0.0205 mol, prepared as described above in PE-3) dissolved in 1,3-bis(trifluoromethyl)benzene (12.5 g) was placed in the addition funnel. The mixture in the flask was heated to 50° C. and the above-described platinum hydrosilation catalyst (0.05 g) was added to the mixture. The allyl ether solution was then added to the resulting mixture dropwise, while maintaining the mixture at 60° C. for four hours. Solvent was then removed from the mixture by rotary evaporation at 50° C. and 15 torr (1.60 kPa) for one hour to obtain 32 g of product. The H-1 and F-19 NMR spectra of the product were consistent with the expected hydrosilation product structure. No allyl ether remained.

Example 1

10.0 g of $D_4^H$ was placed in an 8 dram vial. One drop (approximately 0.015 g) of DBU was added to the vial. The resulting mixture was stirred at room temperature in the absence of moisture for fifteen minutes. This resulted in a storage-stable, 100 percent solids coating formulation. Several drops of the formulation were placed on a polystyrene dish. The formulation spread out and, within five minutes, cured to a transparent, hard coating.

Examples 2-8 and Comparative Examples A and B

Examples 2-8 and Comparative Examples A and B were prepared in essentially the same manner as Example 1, except that the hydrosiloxane was varied as shown in Table 2 below. Cured samples were also prepared using the above-described general method for preparing cured coatings, and the cured samples were tested for their pencil hardness and/or ink repellency by the methods described above. Table 2, below, summarizes the equivalent weights of the hydrosiloxanes used, the approximate curing times, the perceived cure speeds, and the resulting cured coating characteristics for each of Examples 1-8 and Comparative Examples A and B.

TABLE 2

| Example No. | Hydrosiloxane | Equivalent Weight | Curing Time (minutes) | Cure Speed | Result | Pencil Hardness | Ink Repellency |
|---|---|---|---|---|---|---|---|
| 1 | $D_4^H$ | 60 | <5 | Fast | Hard Gel | 2H-3H | 5 |
| 2 | HMS-991 | 67 | <5 | Fast | Hard Gel | H | 5 |

TABLE 2-continued

| Example No. | Hydrosiloxane | Equivalent Weight | Curing Time (minutes) | Cure Speed | Result | Pencil Hardness | Ink Repellency |
|---|---|---|---|---|---|---|---|
| 3 | HMS-992 | 65 | <5 | Fast | Hard Gel | ND | 5 |
| 4 | $D_5^H$ | 60 | <15 | Good | Hard Gel | ND | 5 |
| 5 | Et-$D_4^H$ | 74 | <30 | Good | Hard Gel | ND | 4 |
| 6 | HMS-501 | 135 | Overnight | Slow | Soft Gel | ND | ND |
| 7 | HMS-301 | 245 | Overnight | Slow | Soft Gel | ND | ND |
| 8 | HMS-151 | 490 | Overnight | Did Not Cure | No Gel | ND | ND |
| C-A | DMS-H03 | 225 | Overnight | Did Not Cure | No Gel | ND | ND |
| C-B | TMDS | 67 | Overnight | Did Not Cure | No Gel | ND | ND |

ND = not determined;
<= less than

Examples 9-11

Examples 9-11 were prepared in essentially the same manner as Example 1, except that mixtures of $D_4^H$ and HMS-151 at various weight ratios were used as the hydrosiloxane, as shown in Table 3 below.

Examples 12-13

Examples 12-13 were prepared in essentially the same manner as Example 1, except that mixtures of $D_4^H$ and DMS-H03 at various weight ratios were used as the hydrosiloxane, as shown in Table 3 below.

Table 3 also summarizes the equivalent weights, the hydrosiloxane functionalities of the hydrosiloxane mixtures used, the approximate curing times, the perceived cure speeds, and the resulting cured coating characteristics for each of Examples 1, 8-13, and Comparative Examples A and B.

Examples 14-18

Examples 14-18 were prepared in essentially the same manner as Example 1, except that the hydrosiloxane was fluorine-containing (as described above in Preparative Examples PE-4 through PE-6, PE-8, and PE-9) and was varied as shown in Table 4 below. Table 4 also summarizes the equivalent weights of the fluorine-containing hydrosiloxanes used, the approximate curing times, and the perceived cure speeds for each of Examples 14-18.

TABLE 4

| Example No. | Hydrosiloxane | Equivalent Weight | Curing Time (minutes) | Cure Speed |
|---|---|---|---|---|
| 14 | PE-4 | 82 | <30 | Good |
| 15 | PE-5 | 97 | <30 | Good |
| 16 | PE-6 | 74 | <30 | Good |
| 17 | PE-8 | 114 | <30 | Good |
| 18 | PE-9 | 554 | Did Not Cure | Did Not Cure |

<= less than

TABLE 3

| Example No. | Hydrosiloxane | Equivalent Weight | Hydrosiloxane Functionality | Curing Time (minutes) | Cure Speed | Result |
|---|---|---|---|---|---|---|
| 1 | $D_4^H$ | 60 | 4 | <5 | Fast | Hard Gel |
| 9 | 50 wt % $D_4^H$ and 50 wt % HMS-151 | 107 | >2 | <15 | Good | Hard Gel |
| 10 | 20 wt % $D_4^H$ and 80 wt % HMS-151 | 200 | >2 | <15 | Good | Hard Gel |
| 11 | 9 wt % $D_4^H$ and 91 wt % HMS-151 | 300 | >2 | <30 | Good | Soft Gel |
| 12 | 50 wt % $D_4^H$ and 50 wt % DMS-H03 | 95 | >2 | <30 | Good | Hard Gel |
| 13 | 20 wt % $D_4^H$ and 70 wt % DMS-H03 | 133 | >2 | Overnight | Slow | Soft Gel |
| 8 | HMS-151 | 490 | >2 | Overnight | Did Not Cure | No Gel |
| C-A | DMS-H03 | 225 | 2 | Overnight | Did Not Cure | No Gel |
| C-B | TMDS | 67 | 2 | Overnight | Did Not Cure | No Gel | wt % = weight percent;
>= greater than;
<= less than

We claim:

1. A curable composition consisting essentially of
   (a) at least one polyorganosiloxane, fluorinated polyorganosiloxane, or combination thereof comprising reactive silane functionality comprising at least one hydrosilyl moiety; and
   (b) at least one base selected from amidines, guanidines, phosphazenes, proazaphosphatranes, and combinations thereof;
wherein said curable composition is non-foaming and has an average condensation-curable, reactive silane functionality greater than two; and wherein the curable composition is substantially anhydrous.

2. The composition of claim 1, wherein said component (a) comprises at least one polyorganosiloxane.

3. The composition of claim 2, wherein said polyorganosiloxane comprises cyclic polymethyl(hydro)siloxane, acyclic polymethyl(hydro)siloxane, copolymer comprising methyl(hydro)siloxane units and dimethylsiloxane units, or a combination thereof.

4. The composition of claim 1, wherein said component (a) comprises at least one fluorinated polyorganosiloxane.

5. The composition of claim 4, wherein said fluorinated polyorganosiloxane comprises fluoroalkyl-substituted polyorganosiloxane, fluoroalkylether-substituted polyorganosiloxane, or a combination thereof.

6. The composition of claim 1, wherein said component (a) has an average condensation-curable, reactive silane functionality of at least three.

7. The composition of claim 1, wherein said component (a) has an equivalent weight of less than 1000, based upon said condensation-curable, reactive silane functionality.

8. The composition of claim 1, wherein said component (a) comprises at least one acyclic polysiloxane that is represented by the following general formula:

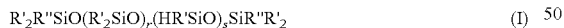

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; each R" is independently hydrogen or R'; r is an integer of 0 to 150; and s is an integer of 1 to 150.

9. The composition of claim 1, wherein said component (a) comprises at least one cyclic polysiloxane that is represented by the following general formula:

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; t is an integer of 0 to 60; and v is an integer of 3 to 10.

10. The composition of claim 1, wherein said component (b) is selected from
   (1) amidine compounds that are represented by the following general formula:

(2) guanidine compounds that are represented by the following general formula:

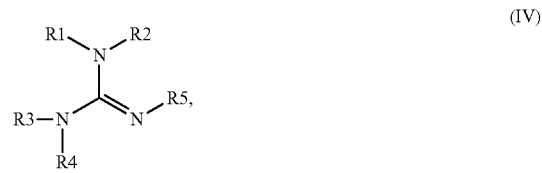

(3) phosphazene compounds that are represented by the following general formula:

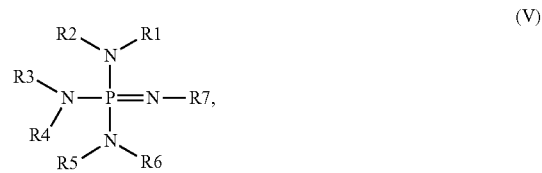

(4) proazaphosphatrane compounds that are represented by the following general formula:

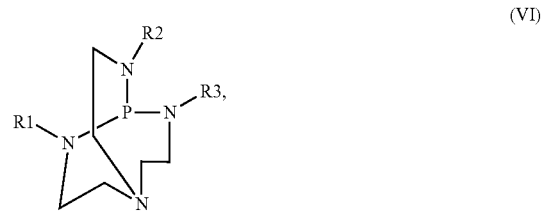

and combinations thereof;
   wherein R1, R2, R3, R4, R5, R6, and R7 are each independently selected from hydrogen, monovalent organic groups, monovalent heteroorganic groups, and combinations thereof; and
   wherein any two or more of R1, R2, R3, R4, R5, R6, and R7 of said amidine, guanidine, and/or phosphazene compounds optionally can be bonded together to form a ring structure.

11. The composition of claim 1, wherein said component (b) is selected from 1,2-dimethyl-1,4,5,6-tetrahydropyrimidine, 1,8-diazabicyclo[5.4.0]-7-undecene (DBU), 1,5-diazabicyclo[4.3.0]-5-nonene (DBN), 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, 2-tert-butylimino-2-diethylamino-1,3-dimethylperhydro-1,3,2-diazaphosphorine, phosphazene base P1-t-Bu-tris(tetramethylene), phosphazene base P4-t-Bu, 2,8,9-triisopropyl-2,5,8,9-tetraaza-1-phosphabicyclo[3.3.3]undecane, and combinations thereof.

12. The composition of claim 1, wherein said base is selected from amidines, guanidines, and combinations thereof.

13. The composition of claim 12, wherein said base is selected from amidines and combinations thereof.

14. The composition of claim 13, wherein said amidine is selected from 1,8-diazabicyclo[5.4.0]-7-undecene (DBU), 1,5-diazabicyclo[4.3.0]-5-nonene (DBN), and combinations thereof.

15. The composition of claim 1, wherein said composition has been cured.

16. A curable composition consisting essentially of
(a) at least one polyorganosiloxane, fluorinated polyorganosiloxane, or combination thereof comprising reactive silane functionality comprising at least three hydrosilyl moieties; and
(b) at least one base selected from 1,8-diazabicyclo[5.4.0]-7-undecene (DBU), 1,5-diazabicyclo[4.3.0]-5-nonene (DBN), and combinations thereof.

17. A coating process comprising
(a) viding the curable polysiloxane composition of claim 1;
(b) providing at least one substrate having at least one major surface;
(c) applying said curable polysiloxane composition to at least a portion of at least one said major surface of said substrate; and
(d) allowing or inducing said curable polysiloxane composition to cure to form a coating.

18. The process of claim 17, wherein said allowing or inducing is carried out by exposing said curable polysiloxane composition to adventitious moisture.

19. An article comprising at least one substrate having at least one major surface, said substrate bearing, on at least a portion of at least one said major surface, a coating prepared by the coating process of claim 17.

* * * * *

UNITED STATES PATENT AND TRADEMARK OFFICE
CERTIFICATE OF CORRECTION

PATENT NO. : 9,175,188 B2  
APPLICATION NO. : 14/407776  
DATED : November 3, 2015  
INVENTOR(S) : Buckanin et al.

Page 1 of 1

It is certified that error appears in the above-identified patent and that said Letters Patent is hereby corrected as shown below:

In the specification

Column 8,  
Lines 13 and 14, delete "—(CF(Z)O)—," and insert -- —(CF(Z))—, —(CF(Z)O)—, --, therefor.  
Line 40, delete "$CF_3O(CF_2O)_nC_2F_4O)_qCF_2$—" and insert -- $CF_3O(CF_2O)_n(C_2F_4O)_qCF_2$— --, therefor.

Column 20,  
Lines 66 and 67, delete "performance" and insert -- performance. --, therefor.

Column 21,  
Line 66, delete "Nov. 15, 2011)," and insert -- Nov. 15, 2011), under Attorney Docket No. 68133US002), --, therefor.

Column 22,  
Line 16, delete "2011)," and insert -- 2011), under Attorney Docket No. 68133US002), --, therefor.

In the claims

Column 30,  
Line 2, in claim 17, delete "viding" and insert -- providing --, therefor.

Signed and Sealed this  
Nineteenth Day of April, 2016

Michelle K. Lee  
*Director of the United States Patent and Trademark Office*